US008587728B2

(12) United States Patent
De La Serna

(10) Patent No.: US 8,587,728 B2
(45) Date of Patent: *Nov. 19, 2013

(54) SYSTEM AND METHOD FOR USING PARTIAL INTERPOLATION TO UNDERTAKE 3D GAMMA ADJUSTMENT OF MICRODISPLAY HAVING DYNAMIC IRIS CONTROL

(75) Inventor: Guillermo Castano De La Serna, Tijuana, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 266 days.

This patent is subject to a terminal disclaimer.

(21) Appl. No.: 13/232,403

(22) Filed: Sep. 14, 2011

(65) Prior Publication Data

US 2012/0002114 A1 Jan. 5, 2012

Related U.S. Application Data

(63) Continuation of application No. 11/724,405, filed on Mar. 15, 2007, now Pat. No. 8,098,336.

(60) Provisional application No. 60/854,194, filed on Oct. 24, 2006.

(51) Int. Cl.
*H04N 9/69* (2006.01)
*H04N 9/30* (2006.01)
*H04N 5/57* (2006.01)

(52) U.S. Cl.
USPC .............................. 348/675; 348/791; 348/687

(58) Field of Classification Search
USPC ......... 348/383, 180, 687, 674, 607, 615, 624, 348/790, 791; 250/208.1; 358/519; 345/600, 601, 589, 88, 89; 353/31, 69, 353/39
See application file for complete search history.

(56) References Cited

U.S. PATENT DOCUMENTS

| 4,866,513 | A | * | 9/1989 | Takahashi | 358/506 |
|---|---|---|---|---|---|
| 6,188,454 | B1 | * | 2/2001 | Greene et al. | 349/74 |
| 6,570,611 | B1 | * | 5/2003 | Satou et al. | 348/189 |
| 7,220,006 | B2 | * | 5/2007 | Allen et al. | 353/85 |
| 7,330,287 | B2 | * | 2/2008 | Sharman | 358/1.9 |
| 2002/0027608 | A1 | * | 3/2002 | Johnson et al. | 348/383 |
| 2006/0221020 | A1 | * | 10/2006 | Winer et al. | 345/84 |
| 2006/0221326 | A1 | * | 10/2006 | Cok et al. | 356/121 |
| 2007/0065008 | A1 | * | 3/2007 | Kao et al. | 382/169 |
| 2007/0103583 | A1 | * | 5/2007 | Burnett et al. | 348/383 |
| 2007/0103646 | A1 | * | 5/2007 | Young | 353/52 |
| 2007/0139625 | A1 | * | 6/2007 | Berman | 353/84 |
| 2007/0171183 | A1 | * | 7/2007 | Yang et al. | 345/102 |
| 2007/0182847 | A1 | * | 8/2007 | Ishiwata | 348/383 |
| 2007/0291185 | A1 | * | 12/2007 | Gelb et al. | 348/745 |

* cited by examiner

*Primary Examiner* — Victor Kostak
(74) *Attorney, Agent, or Firm* — John L. Rogitz

(57) ABSTRACT

In a microdisplay TV with dynamic iris control, interpolation is used to undertake 3D gamma adjustment of the display for intermediate brightness levels.

8 Claims, 1 Drawing Sheet

SYSTEM AND METHOD FOR USING PARTIAL INTERPOLATION TO UNDERTAKE 3D GAMMA ADJUSTMENT OF MICRODISPLAY HAVING DYNAMIC IRIS CONTROL

RELATED APPLICATION

This is a continuation of and claims priority from U.S. patent application Ser. No. 11/724,405, filed Mar. 15, 2007, now U.S. Pat. No. 8,098,336 which itself claims priority from U.S. provisional application Ser. No. 60/854,194, filed Oct. 24, 2006.

I. FIELD OF THE INVENTION

The present invention relates generally to systems and methods for using partial interpolation to undertake 3D gamma adjustment of microdisplays having dynamic iris control.

II. BACKGROUND OF THE INVENTION

Many modern video displays such as the Sony Grand Wega™ television use three microdisplays, one each for the primary colors of red, green, and blue. Each microdisplay can be, e.g., a liquid crystal display (LCD). To display a picture on the screen, the LCDs are illuminated by a bright lamp and through a set of lenses and prisms the final image is expanded to fill relatively large screens.

As understood herein, it is difficult at best to manufacture LCDs to have precisely uniform thicknesses, and even very small variations in thickness cause non-uniformity in the screen display such that some areas of the screen might appear to be brighter than others or tinged with artificial color. This undesirable appearance is magnified when the output of the LCD is optically expanded as is done in microdisplay televisions.

Accordingly, the present invention recognizes that a microdisplay uniformity adjustment process should be employed during TV production to compensate for imperfections in LCD thickness. For example, the uniformity adjustment process known as 3D gamma can be used. As understood herein, while the adjustment ideally is done on a pixel by pixel basis, to render the adjustment process feasible adjustment is performed on regions of pixels, e.g., the set of display pixels can be arranged in 372 regions and uniformity adjustment performed for each region. Essentially and with particular regard to 3D gamma adjustment, a calibration computer is operated to "adjust" the display controller chip by effectively "adding" or "subtracting" display element drive offsets (typically stored in the chip's memory) for each region as needed to achieve uniformity, usually with respect to a center region.

As further understood herein, dynamically variable irises have been provided at the input of the microdisplay LCDs to provide improved brightness and contrast expression especially in darker scenes. The present invention recognizes, however, that the introduction of dynamically variable irises requires multiple uniformity adjustments, i.e., one uniformity adjustment for each of a series of brightness levels. The present invention has critically observed that multiplying the number of uniformity adjustments that must be made during production can undesirably slow production significantly.

The invention still further understands that attempting to streamline uniformity adjustment using statistical analyses, e.g., by starting adjustment at some statistically average value, is less than optimum in the case of microdisplays, particularly for intermediate brightness levels. This is because the pattern formed for each set of adjustments is the combination of the overlap of three different microdisplays, each with its own unique pattern, which defies the use of conventional statistics. With these critical recognitions in mind, the invention herein is provided.

SUMMARY OF THE INVENTION

A method is disclosed for accelerating uniformity adjustment of a display such as a microdisplay TV having red, green, and blue microdisplays and a screen configured to receive projections from the microdisplays. For one or more regions of the microdisplay TV, respective uniformity adjustments are determined for at least first and second brightness levels. The method includes interpolating the uniformity adjustments for the first and second brightness levels to determine a uniformity adjustment for at least a third brightness level. The uniformity adjustments for all three brightness levels are then applied to a controller associated with the TV.

In some embodiments the TV includes a dynamic iris. The microdisplays are configured to receive light from the iris, and the third brightness level is intermediate the first and second brightness levels. If desired, the method includes interpolating the uniformity adjustments for the first and second brightness levels to determine a uniformity adjustment for a fourth brightness level that, like the third brightness level, is intermediate the first and second brightness levels.

In one embodiment linear interpolation is used in the act of interpolating. In another embodiment spline interpolation is used in the act of interpolating. In this latter embodiment, the first and second brightness levels are at respective ends of a brightness range and the method includes determining uniformity adjustments for fourth and fifth brightness levels that effectively function as control points, with the fourth and fifth brightness levels being intermediate the first and second brightness levels. The interpolation includes interpolating the uniformity adjustments for the first, second, fourth, and fifth brightness levels to determine the uniformity adjustment for the third brightness level. In specific implementations uniformity adjustments for sixth and seventh brightness levels can also be interpolated.

Additionally, if desired a level "0" uniformity adjustment for an open iris condition (or equivalently for a closed iris condition) can be multiplied by a statistically determined amount to determine a uniformity adjustment for the other iris condition.

In another aspect, a calibration computer is programmed with logic that includes determining at least first and second adjustments corresponding to first and second brightness levels, and interpolating the first and second adjustments to calculate at least a third adjustment for a third brightness level between the first second levels. The logic includes applying the first through third adjustments to a display controller to promote display uniformity.

In still another aspect, a computer readable medium bears computer readable code that includes means for determining respective gamma adjustments for at least two brightness levels of a display, and means for interpolating the gamma adjustments to calculate an interpolated adjustment for a brightness level between the two brightness levels. Means are provided for communicating the gamma adjustments to a display controller for use thereof in establishing relative display uniformity.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
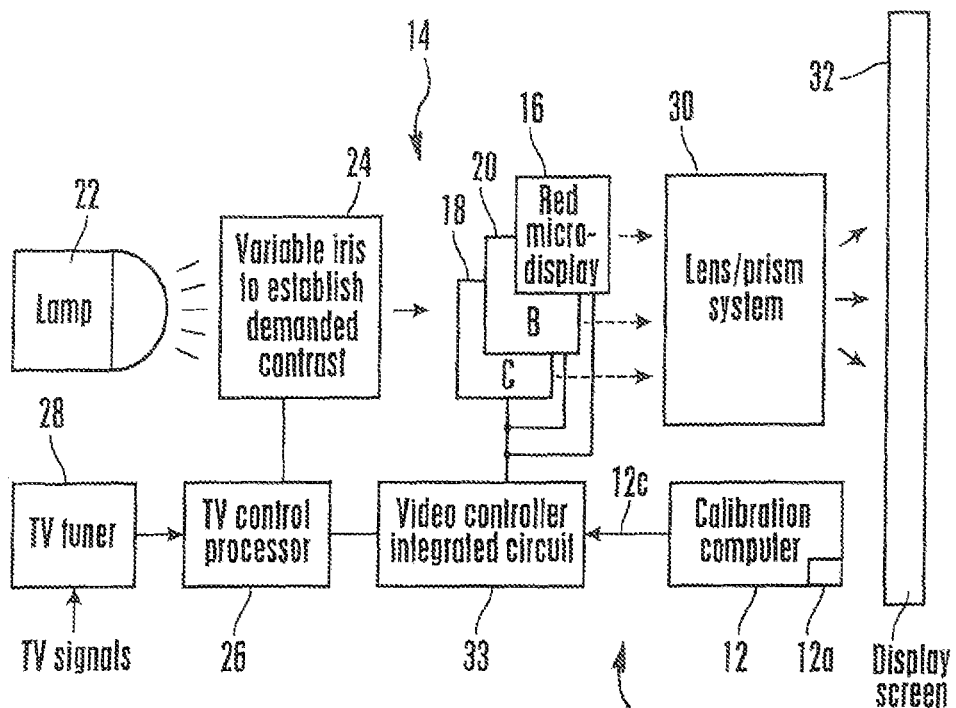
FIG. 1 is a block diagram of a non-limiting microdisplay TV with calibration computer.

Referring initially to FIG. 1, a system is shown, generally designated 10, that includes a calibration computer 12, typically located in a TV production facility, and a TV 14 having red, green, and blue microdisplays 16, 18, 20. The microdisplays 16-20 may be LCDs that are illuminated by one or more lamps 22 through a dynamically variable iris 24, with the iris 24 being controlled by a TV control processor 26 in accordance with dynamic iris control principles known in the art to establish display brightness. The TV processor 26 can control the iris 24 as appropriate to display a TV video signal from a TV tuner 28 as shown. As shown in FIG. 1, light from the microdisplays 16-20 is directed through a lens/prism system 30 onto a relatively large TV display screen 32 to render a video image on the screen 32 that is viewable by a person.

Either the TV processor 26 or, in the embodiment shown in FIG. 1, a video controller integrated circuit (IC) 33 that may communicate with the TV processor 26, controls the LCDs 16-20. In one non-limiting embodiment the calibration computer 12 may communicate with the video controller IC 33 using, e.g., I2C communication principles to establish uniformity adjustments in the memory of the IC 33 in accordance with principles below.

Figure 2:
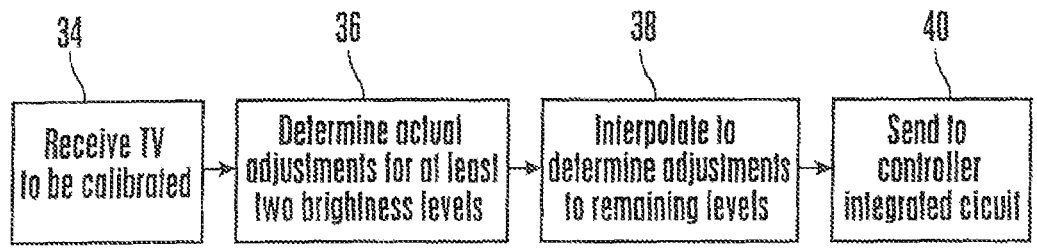
FIG. 2 is a flow chart of non-limiting logic that can be used to establish uniformity adjustments in the TV shown in FIG. 1, with at some of the logic being executed by the calibration computer.

Indeed and now turning to FIG. 2, the overall logic of the invention may be seen. At block 34 the TV to be calibrated (e.g., the TV 14) is received and at block 36 actual uniformity adjustments are determined in accordance with principles known in the art (e.g., 3D gamma adjustment principles) for at least two brightness levels of the iris 24. Moving to block 38, the two adjustments are interpolated to determine uniformity adjustments for remaining brightness levels of the iris 24. In one implementation fourteen brightness levels may be selected for adjustment, seven (in sequence, from less bright to more bright, levels "0" through "6") for relatively closed iris configurations and seven (also referred to herein as levels "0" through "6") for relatively open iris configurations. At block 40, all adjustment values, both those determined conventionally and those calculated using the interpolation of the present invention, are sent to the display controller IC 32 for use thereby in accordance with principles known in the art.

In one non-limiting implementation, the calibration computer 12 uses linear interpolation. In this implementation the values of brightness levels "3" through "5" can be based on simple linear interpolation between levels "2" and "6".

More specifically, if the adjustment values for levels "2" and "6" are represented as Y2 and Y6, then the value for the internal levels are calculated as:

$$Y_{level\ n} = A[n] + C,$$

wherein "n" for level 3 is 3, for level 4 is 4, and for level 5 is 5, and the constants "A" and "C" are given by: $A = (Y6-Y2)/4$ and $C = [3(Y2-Y6)]/2$.

As recognized herein, a better interpolation may be achieved using a spline interpolation. In one non-limiting implementation, a cubic Bezier fit may be used that may be defined by four points. Two of the points are located at the start and the end of the brightness range and two are used as control points.

In this example implementation of interpolation, respective X and Y adjustment values for the intermediate brightness levels "3" through "5" may be calculated based on a parameter "t" that changes between 0 and 1 as follows:

$$X(t) = a_x t^3 + b_x t^2 + c_x t + X_0$$

$$Y(t) = a_y t^3 + b_y t^2 + c_y t + Y_0,$$

wherein $X_0$ and $Y_0$ are the adjustment values for brightness level "0", the above coefficients and value for "t" are described further below, and the "x" and "y" dimension are screen dimensions with each "x" and "y" pair representing a pixel region of the display.

Because for the X axis all values of the curve are known (1, 2, 3, 4, 5, 6) the coefficients are fixed as $a_x = -4$, $b_x = 6$, and $c_x = 3$.

It is to be understood that a Bezier curve for x(t) is $at^3 + bt^2 + ct + x_1$, wherein "t" ranges from zero to one in even increments and $x_1$ is the "x" coordinate value of the level "1" point in the coordinate system. Because the present invention uses four set points $(x_1,y_1),(x_2,y_2),(x_3,y_3),(x_4,y_4)$ and for each point the "x" value is consecutive, the coordinates simplify to $(1,y_1),(2,y_2),(3,y_3),(4,y_4)$. The coefficients of the Bezier curve are calculated for "X" in the same way as for the Y coordinate:

$$c = 3*(X_2 - X_1)$$

$$b = 3*(X_5 - X_2) - c$$

$$a = X_6 - X_1 - c - b$$

Since $X_1 = 1$, $X_2 = 2$, $X_3 = 3$, $X_6 = 6$ then $c = 3*(2-1) = 3$; $b = 3*(5-2) - 3 = 6$; $a = 6 - 1 - 3 - 6 = -4$ As recognized herein, for the spline interpolation method, for the Y axis proper values must be established for the control points, designated herein as $Y_{control2}$ and $Y_{control5}$. Preferably, the following equations are used to determine the control points:

$$Y_{control2} = Y_2 + (Y_2 - Y_1)/2;$$

$$Y_{control5} = Y_6 + (Y_2 - Y_6)/2,$$

wherein $Y_1$, $Y_2$, and $Y_5$ are the Y-axis adjustments for brightness levels 1, 2, and 5, respectively as conventionally determined using, e.g., 3D gamma adjustment principles known in the art.

Accordingly, the y-dimension coefficients may be calculated by:

$$c_y = 3*(Y_{control2} - Y_1)$$

$$b_y = 3*(Y_{control5} - Y_{control2}) - c_y;\ \text{and}$$

$$a_y = Y_6 - Y_1 - c_y - b_y$$

The above coefficients are dynamically generated for each pixel region.

Finally, to calculate the adjustment values for each of the three intermediate brightness levels, empirically determined values for "t" are used as follows. The values for "t" may be determined to achieve a best fit curve for the particular genre of display being calibrated.

$$Y(3)=a_y*0.074088+b_y*0.1764+c_y*0.42+Y_1$$

$$Y(4)=a_y*0.205379+b_y*0.3481+c_y*0.59+Y_1$$

$$Y(5)=a_y*0.456533+b_y*0.5929+c_y*0.77+Y_1$$

In addition to the above, the present invention recognizes that the adjustment of level 0 in "open" and "closed" iris conditions consumes a disproportionately large part of the calibration time. Accordingly, the present invention recognizes the desirability of eliminating at least one of the adjustment calculations.

In one non-limiting implementation this may done by a simple statistic-based calculation method. Actual adjustment may be conventionally determined for, e.g., the brightness level "0" in the open iris condition to create data for the adjustment value to be used for the brightness level "0" in the closed iris condition (or vice-versa, in some embodiments).

A large number of sets of closed/open "0" values may be reviewed to determine a statistical extrapolation from one "0" value to the other. For example, the "0" adjustment value in the open condition (determined using, e.g., conventional 3D gamma principles known in the art) may be divided by a statistically determined constant to quickly calculate the "0" adjustment value for the other condition without having to employ time-consuming 3D gamma determination principles for the latter value, with both the determined and calculated "0" values subsequently being applied to the display controller IC 32.

Each of the three microdisplays can be adjusted independently. In one implementation, the red and blue microdisplays are adjusted independently, and the green microdisplay is kept neutral.

The logic above may be performed at least in part by the calibration computer 12, which can have a computer readable medium 12a for storing the logic. The medium 12a may be, without limitation, solid state storage or disk storage.

While the particular SYSTEM AND METHOD FOR USING PARTIAL INTERPOLATION TO UNDERTAKE 3D GAMMA ADJUSTMENT OF MICRODISPLAY HAVING DYNAMIC IRIS CONTROL is herein shown and described in detail, it is to be understood that the subject matter which is encompassed by the present invention is limited only by the claims.

What is claimed is:

1. A calibration computer including a processor and a computer readable medium that is programmed with code which, when executed, causes the computer to execute the following method acts:
    determining at least first and second adjustments corresponding to first and second brightness levels;
    combining the first and second adjustments to at least in part calculate a third adjustment for a third brightness level between the first second levels; and
    applying the first through third adjustments to a display controller to promote display uniformity.

2. The computer of claim 1, wherein the TV includes a dynamic iris, a display communicating with the display controller being configured to receive light from the iris, at least in part the iris establishing the brightness levels during TV operation.

3. The computer of claim 1, wherein the combining the first and second adjustments comprises interpolating at least the uniformity adjustments for the first and second brightness levels to determine a uniformity adjustment for at least a fourth brightness level intermediate the first and second brightness levels.

4. The computer of claim 1, wherein the first and second brightness levels are at respective ends of a brightness range and the determining at least first and second adjustments includes determining uniformity adjustments for fourth and fifth brightness levels, the fourth and fifth brightness levels being intermediate the first and second brightness levels, the processor when executing the code on the computer readable medium being further configured for interpolating the uniformity adjustments for the first, second, fourth, and fifth brightness levels to determine the uniformity adjustment for the third brightness level.

5. The computer of claim 4, wherein the interpolating the uniformity adjustments includes interpolating the uniformity adjustments for the first, second, fourth, and fifth brightness levels to determine the uniformity adjustment for the third brightness level, uniformity adjustment for a sixth brightness level, and a uniformity adjustment for a seventh brightness level, the sixth and seventh brightness levels being intermediate the first and second brightness levels.

6. The computer of claim 1, wherein the processor when executing the code on the computer readable medium is further configured for multiplying a level "0" uniformity adjustment for one of an open iris condition, or a closed iris condition, by a statistically determined amount to determine a uniformity adjustment for the other of the open iris condition, or the closed iris condition.

7. A computer readable medium that is not a carrier wave per se and that bears computer readable code which when executed by a processor configures the processor for:
    determining respective gamma adjustments for at least two brightness levels of a display;
    interpolating the gamma adjustments to calculate an interpolated adjustment for a brightness level between the two brightness levels; and
    communicating the gamma adjustments to a display controller for use thereof in establishing relative display uniformity.

8. The medium of claim 7, wherein the code when executed by the processor configures the processor for:
    interpolating the uniformity adjustments for first, second, fourth, and fifth brightness levels to determine a uniformity adjustment for a third brightness level, a uniformity adjustment for a sixth brightness level, and a uniformity adjustment for a seventh brightness level, the sixth and seventh brightness levels being intermediate the first and second brightness levels.

* * * * *